United States Patent [19]

Hishida

[11] Patent Number: 5,065,254

[45] Date of Patent: Nov. 12, 1991

[54] FACSIMILE MACHINE AND FACSIMILE TRANSMISSION SYSTEM

[75] Inventor: Hiroshi Hishida, Atsugi, Japan

[73] Assignee: Ricoh Company, Ltd., Tokyo, Japan

[21] Appl. No.: 440,652

[22] Filed: Nov. 24, 1989

[30] Foreign Application Priority Data

Dec. 6, 1988 [JP] Japan .................................. 63-306875

[51] Int. Cl.$^5$ .............................................. H04N 1/01
[52] U.S. Cl. .................................... 358/400; 358/402;
358/408; 358/440; 358/463
[58] Field of Search ............... 358/400, 402, 403, 407,
358/408, 440, 468

[56] References Cited

U.S. PATENT DOCUMENTS

| | | | |
|---|---|---|---|
| 4,532,379 | 7/1985 | Tsukioka | 358/407 |
| 4,829,559 | 5/1989 | Izawa et al. | 358/468 |
| 4,870,503 | 9/1939 | Miura | 358/408 |
| 4,994,926 | 2/1991 | Gordon et al. | 358/407 |

FOREIGN PATENT DOCUMENTS 16667 1/1986 Japan .
214859 9/1986 Japan .

Primary Examiner—Edward L. Coles, Sr.
Attorney, Agent, or Firm—Oblon, Spivak, McClelland, Maier & Neustadt

[57] ABSTRACT

A facsimile machine includes a scanner, a plotter, a communicating device, a memory storing the image data supplied from the scanner and supplied, through the communicating device, from a source facsimile machine coupled to the transmission line through a network, a second memory storing a plurality of programs each defining a procedure for relaying the image data supplied from the communicating device to at least one destination facsimile machine, and an input device inputting the plurality of programs into the second memory. The facsimile machine further includes a device determining which one of the plurality of programs is designated by the source facsimile machine by referring to a select signal supplied from the source facsimile machine through the communicating device, and a relay transmission executing device relaying the image data supplied from the source and then stored in the second memory to the destination facsimile machine in accordance with one of the plurality of programs which is selected by the source facsimile.

26 Claims, 14 Drawing Sheets

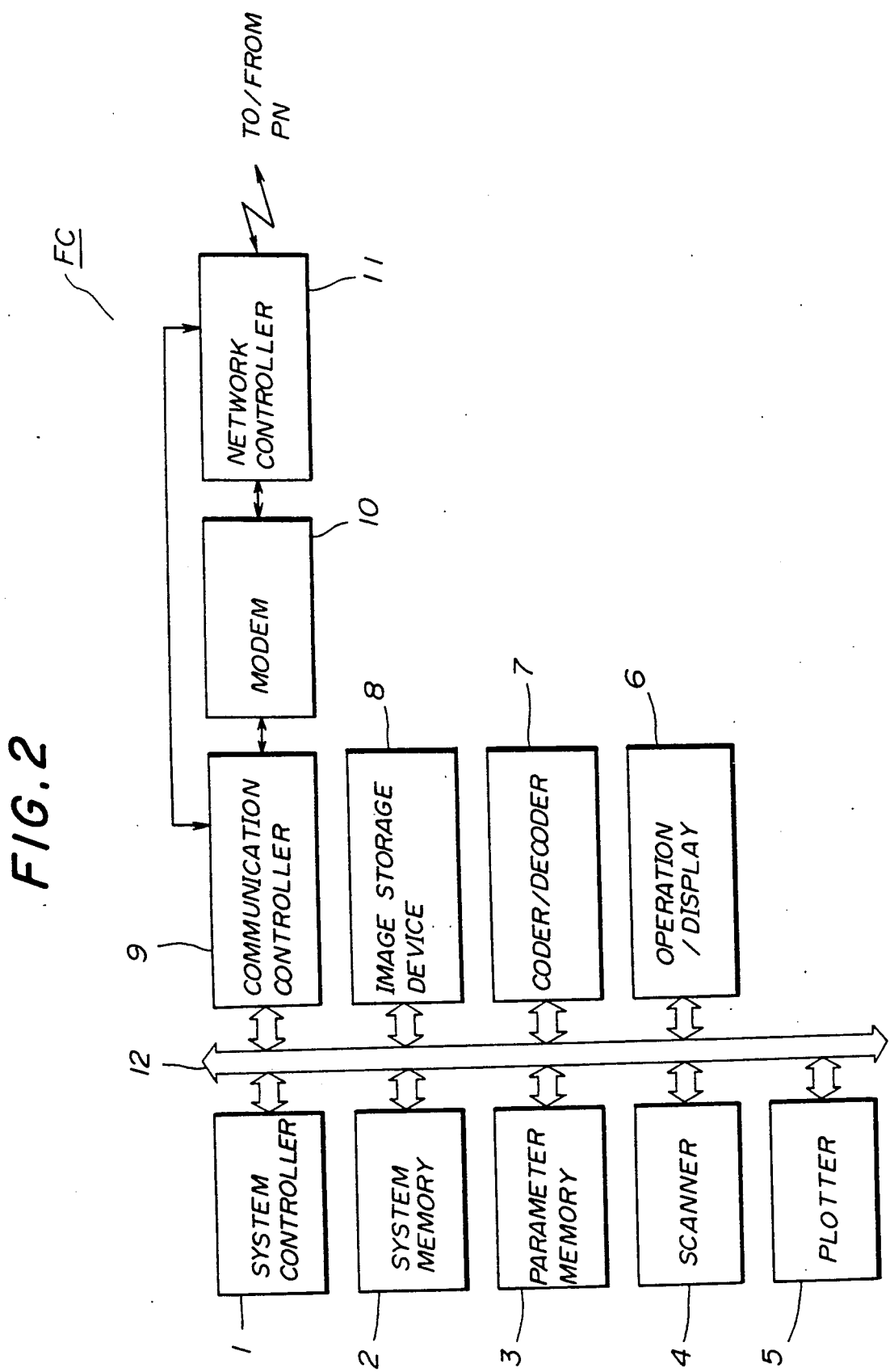

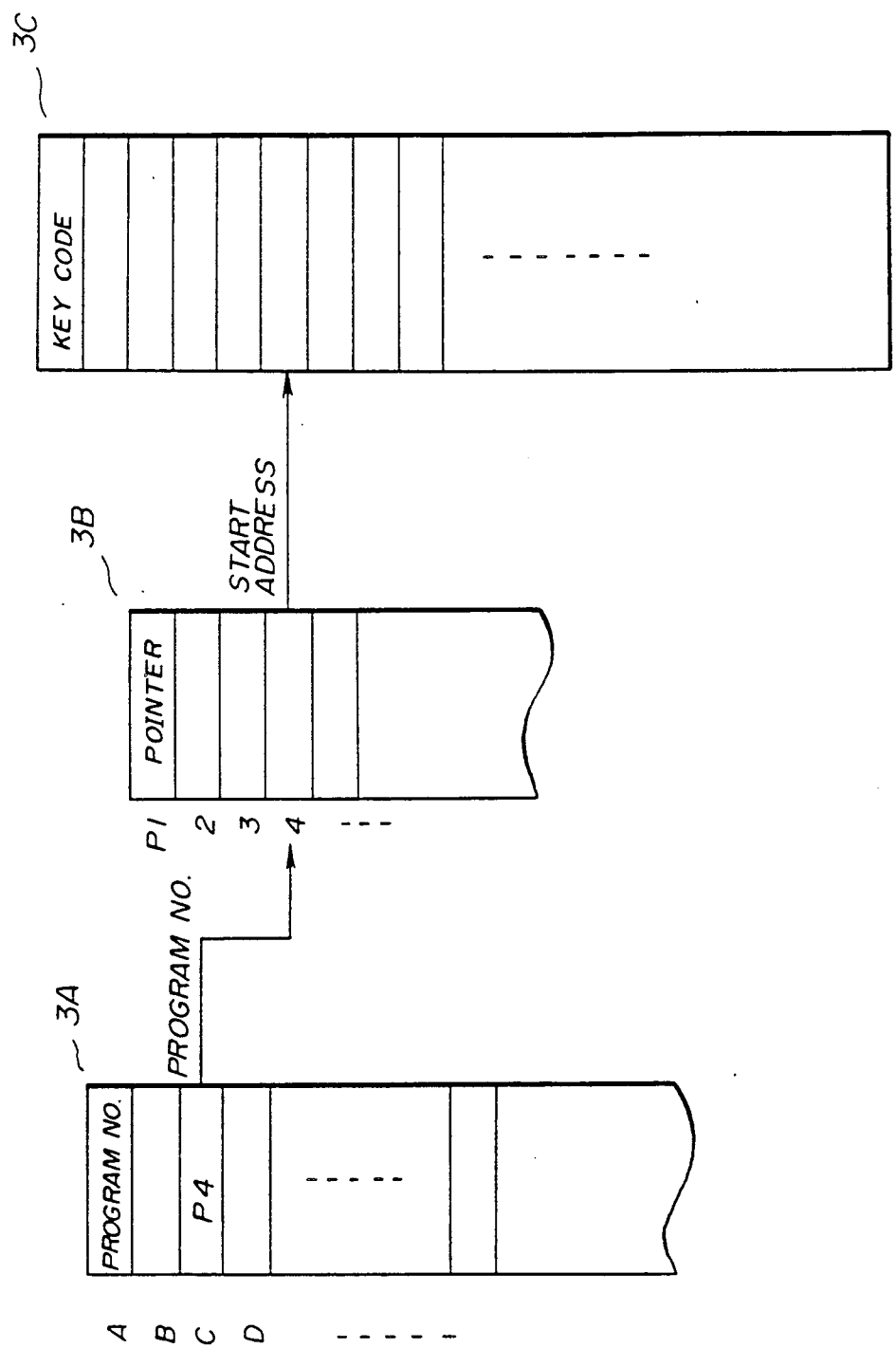

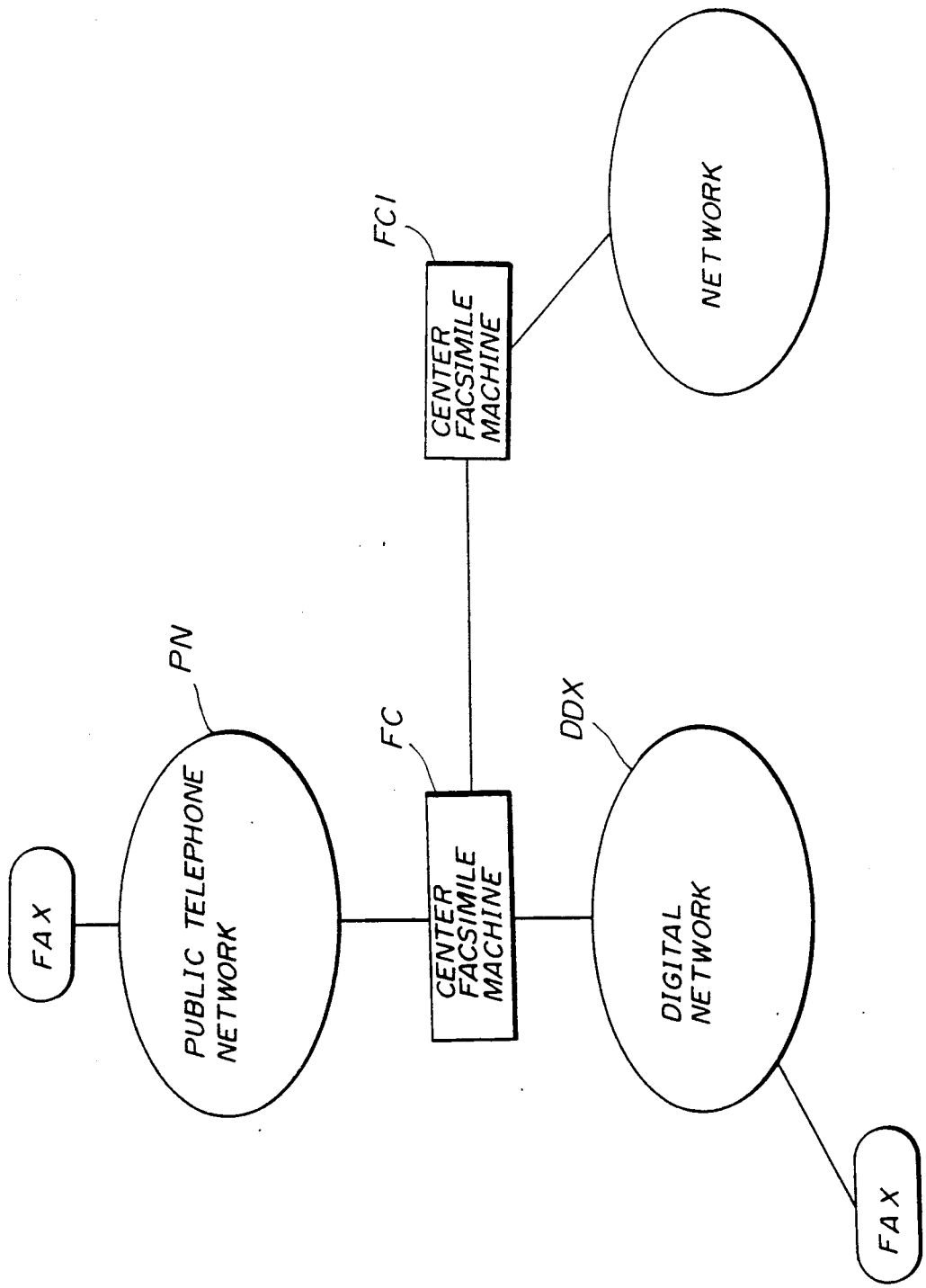

FACSIMILE MACHINE AND FACSIMILE TRANSMISSION SYSTEM

BACKGROUND OF THE INVENTION

The present invention generally relates to a facsimile machine and a facsimile transmission system including this facsimile machine. More particularly, the present invention is directed to a facsimile machine having a relay function and a facsimile transmission system including this facsimile machine.

Recently, a facsimile machine having a large capacity memory device for storing image data and a relay function using the memory device has been in practical use. Such a facsimile machine serves as a center device in a facsimile network.

Japanese Laid-Open Patent Application No. 61-214859 discloses a relay device which has a table memory storing identification codes and destination information (telephone numbers). Destinations are divided into groups to which the corresponding identification codes are given. An operator on the transmission side designates one of the groups through an input key provided in a facsimile machine. The relay device is informed of this selection. Then the transmitter facsimile machine sends the relay device image data. Then the relay device sends the received image data to the destination facsimile machines of the selected group at the same time or in turn.

Japanese Laid-Open Patent Application No. 61-16667 discloses a facsimile machine serving as a relay device which enables broadcasting communication. The proposed facsimile machine has a table in which management information on destination facsimile machines is defined. A transmitter facsimile machine inputs a transmission order mode, and then sends the relay device image data. After storing the image data in an image memory provided in the relay device, the relay device sequentially sends the image data to designation facsimile machines which are defined in the table.

However, the proposed facsimile machines cannot provide a variety of relay transmission of image data.

SUMMARY OF THE PRESENT INVENTION

Accordingly, a general object of the present invention is to provide an improved facsimile machine in which the above-mentioned disadvantage is eliminated.

A more specific object of the present invention is to provide a facsimile machine which can provide a variety of relay transmission of image data.

The above objects of the present invention is achieved by a facsimile machine comprising scanning means for scanning a document to generate image data; recording means for recording an image on a recording medium; communicating means, coupled to the scanning means and the recording means, for exchanging image data with a transmission line coupled to the facsimile machine; first storage means for storing the image data supplied from the scanning means and supplied, through the communicating means, from a source facsimile machine coupled to the transmission line through a network; and second storage means for storing a plurality of programs each defining a procedure for relaying the image data supplied from the communicating means to at least one destination facsimile machine. The facsimile machine further comprises inputting means, coupled to the second storage means, for inputting the plurality of programs into the second storage means; decision means, coupled to the communicating means, for determining which one of the plurality of programs is designated by the source facsimile machine by referring to a select signal supplied from the source facsimile machine through the communicating means; and relay transmission executing means, coupled to the communicating means, the first and second storage means and the decision means, for relaying the image data supplied from the source facsimile machine and stored in the second storage means to the destination facsimile machine in accordance with one of the plurality of programs which is selected by the source facsimile machine.

Another object of the present invention is to provide a facsimile transmission system including the above-mentioned facsimile machine.

This object of the present invention is achieved by a facsimile transmission system comprising a network; a plurality of facsimile machines coupled to the network; and a center facsimile machine coupled to the network. This center facsimile machine includes the above-mentioned structural elements.

Additional objects, features and advantages of the present invention will become apparent from the following detailed description when read in conjunction with the accompanying drawings.

BRIEF DESCRIPTION OF THE DRAWINGS

FIG. 2 is a block diagram of the center facsimile machine according to an embodiment of the present invention;

FIG. 7 is a diagram illustrating the relationship between a program key table, a program registration management table, and a program data area, all of which are formed in a parameter memory provided in the center facsimile machine shown in FIG. 2;

FIG. 16 is a diagram illustrating yet another network which employs the center facsimile machine according to the present invention.

DESCRIPTION OF THE PREFERRED EMBODIMENTS

Figure 1:
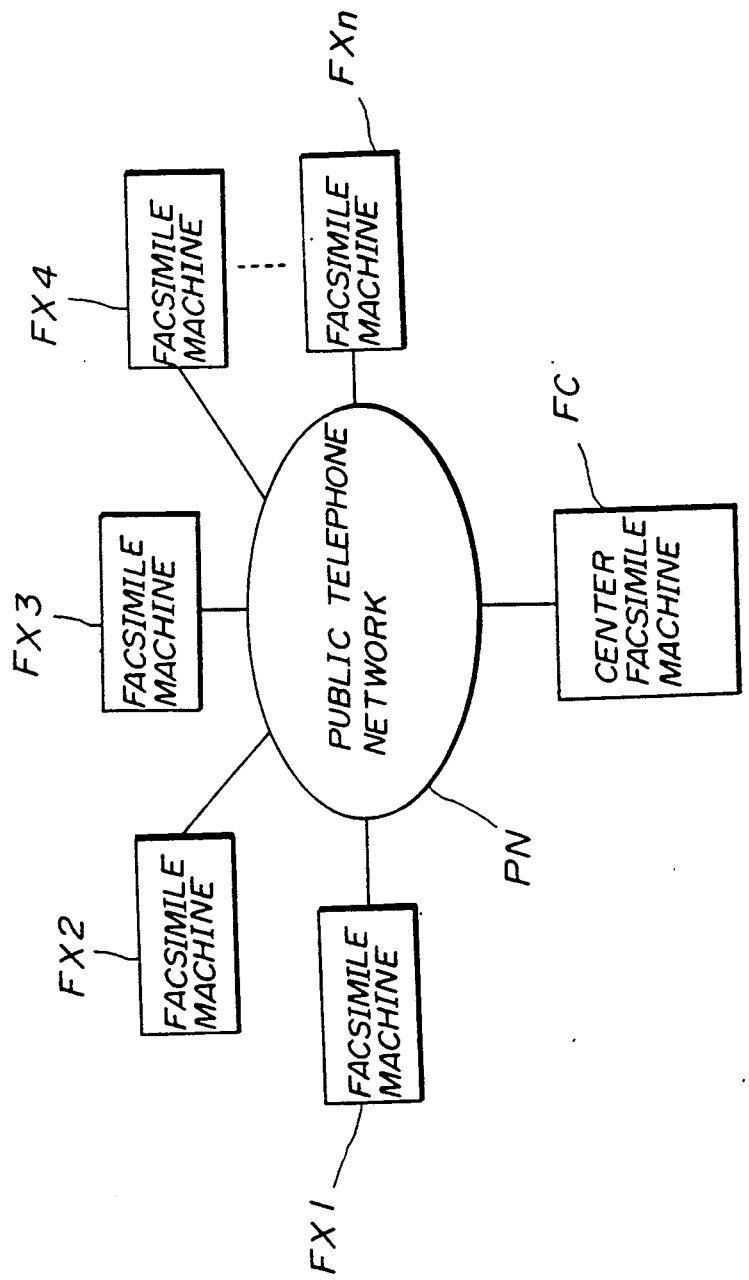
FIG. 1 is a diagram of a network which employs a center facsimile machine configured according to the present invention.

Referring to FIG. 1, there is illustrated a facsimile transmission network (system) which employs facsimile machines according to the present invention. The facsimile transmission network includes a public telephone network PN, a single center facsimile machine FC coupled to the public telephone network PN, and a plurality of facsimile machines FX1-FXn coupled to the public telephone network PN. Each of the center facsimile machine FC and the facsimile machines FX1-FXn has a group-3 facsimile transmission function defined by the CCITT recommendation in this example. The center facsimile machine FC, which is configured according to the present invention, receives a request of relay transmission of image data sent from any one of the facsimile machines FX1-FXn, and sends a destination facsimile machine the received image data by using a transmission function designated by the source facsimile machine.

FIG. 2 is a block diagram of the center facsimile machine FC. Referring to FIG. 2, a system controller 1 controls the entire center facsimile machine FC, and is formed by a conventional central processing unit, for example. A system memory 2 stores control processing programs executed by the system controller 1, various parameter data required when the system controller 1 executes the control processing programs, and data relating to guidances. A parameter memory 3 stores a variety of data inherent in the center facsimile machine FC. Such data includes registered data on suppressed dials, registered data on passwords used when confidential transmission is requested, registered program data relating to a variety of relaying transmission procedures, and data relating to created files (those will be described in detail later).

A scanner 4 is used for reading a document with a predetermined resolution when the center facsimile machine FC is not used as the center (relay device) but as a simply facsimile machine. A plotter 5 records reproduced images on a sheet of paper with a predetermined resolution. A operation/display device 6 is used for inputting various information in the center facsimile machine FC. As will be described in detail later, the operation/display device 6 includes a plurality of operation keys and a display device. A coder/decoder 7 encodes image data to compress the same, and decodes compressed data to reproduce original image data. An image storage device 8 can be formed by a large capacity of a semiconductor memory and stores image data.

A communication controller 9 executes a predetermined facsimile transmission procedure (a group-3 facsimile transmission procedure based on the CCITT recommendation). A modulator/demodulator (MODEM) 10 modulates transmission data in digital form to generate a corresponding analog signal in conformity with the public telephone network PN (analog transmission network), and demodulates an analog signal received through the public telephone network PN to generate corresponding digital data. A network controller 11 is used for coupling the center facsimile machine FC with the public telephone network PN through a transmission line. The network controller 11 is equipped with a conventional automatic call-out/call-in function. A system bus 12 mutually couples the system controller I, the system memory 2, the parameter memory 3, the scanner 4, the plotter 5, the operation/display device 6, the coder/decoder 7, the image storage device 8 and the communication controller 9.

Figure 3A:
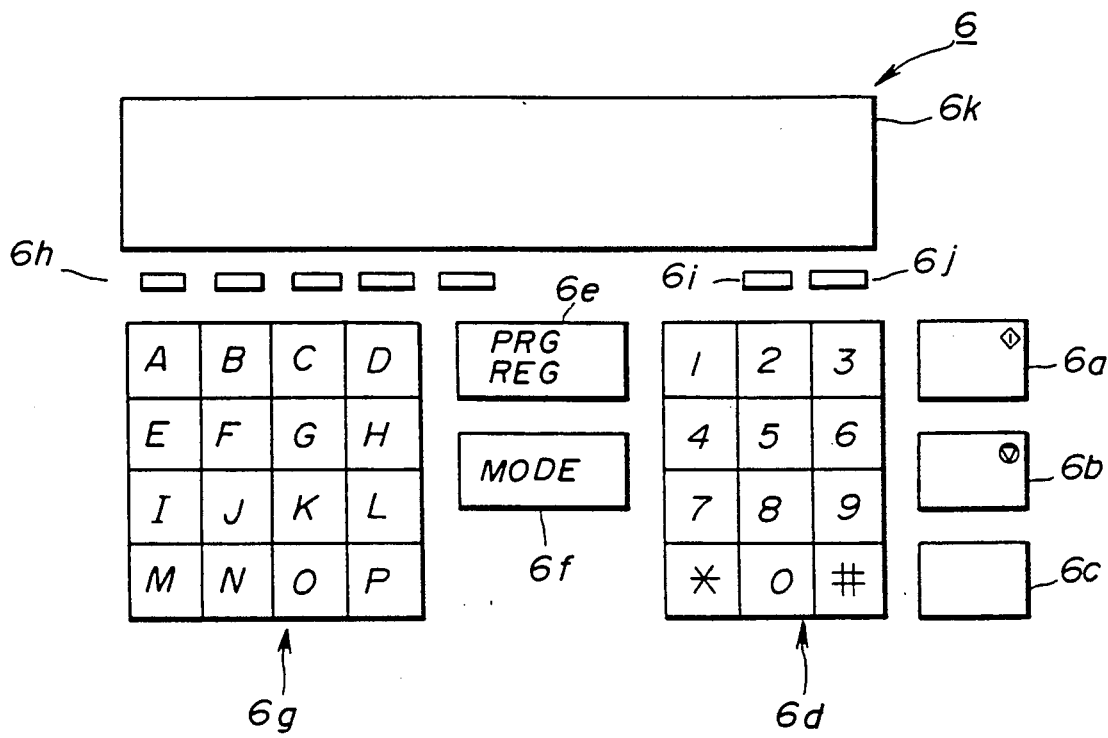
FIG. 3A is a diagram illustrating an outer appearance of an operation/display device provided in the center facsimile machine.
Figure 3B:
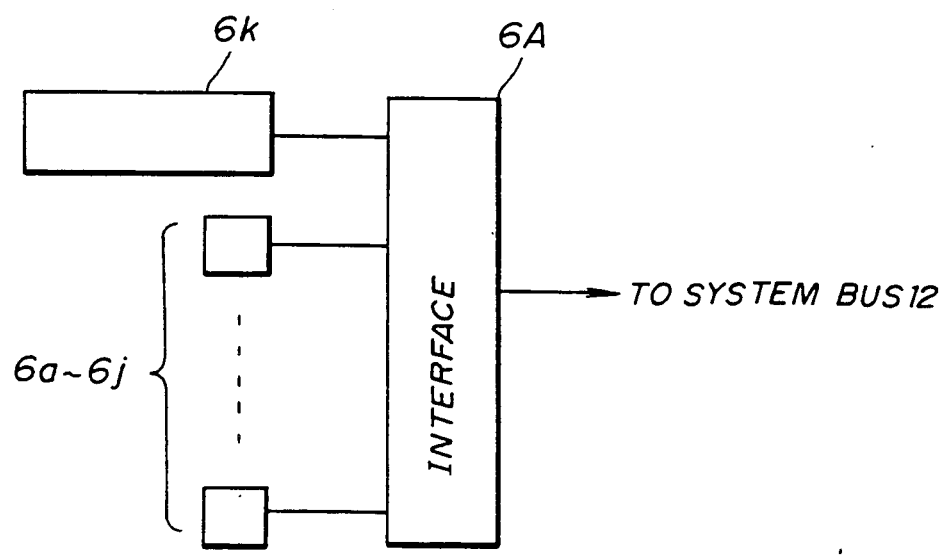
FIG. 3B is a block diagram of an electrical part of the operation/display device shown in FIG. 3A.

FIG. 3A is a diagram illustrating an outer appearance of the operation/display device 6. A start key 6a is used for starting receiving/transmitting operation of the center facsimile machine FC. Further, the start key 6a is used when registering a program relating to the program relay transmission. A stop key 6b is used for stopping receiving/transmitting operation of the center facsimile machine FC. A copy key 6c is used for outputting a printed document such as a management report. A ten key 6d is used for inputting various numerical information such as telephone numbers and suppressed dials. A program registration key 6e is used for registering a program in the center facsimile machine FC so as to relate to one of keys A through P of a program key group 6g. This procedure is done in a program registration mode. A mode key 6f is used when one of predetermined functions (modes) which can be executed by the center facsimile machine FC is selected. The program key group 6g is used when a program relating to the program relay transmission is registered. A group of function keys 6h is used for selecting items (menus) displayed on a liquid crystal display (hereinafter simply referred to as a display) 6k. Keys 6i and 6j are used for inputting "YES" and "NO" to confirm whether input data displayed on the display 6k is correct. As shown in FIG. 3B, the keys 6a through 6j and the display 6k are coupled to the system bus 12 through an interface 6A.

Figure 4:
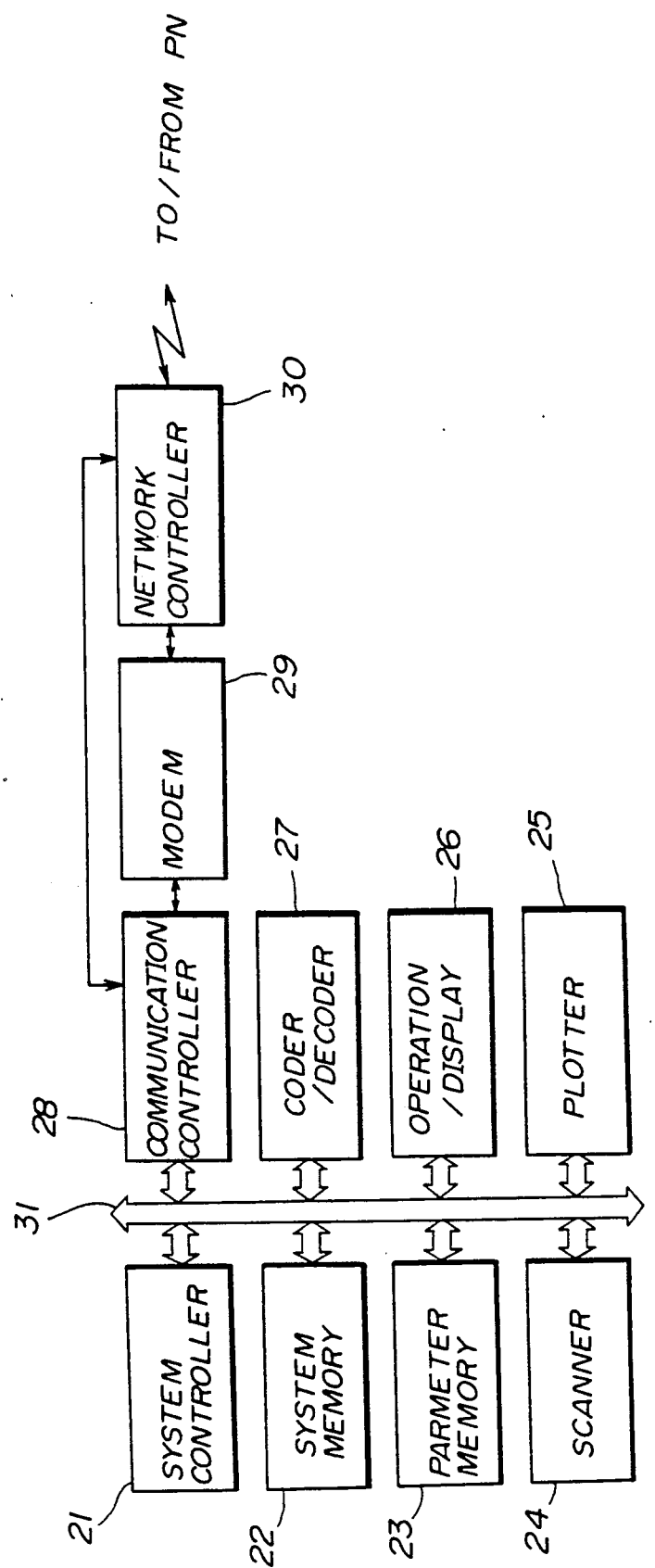
FIG. 4 is a block diagram of a facsimile machine coupled to the network shown in FIG. 1 other than the center facsimile machine.

FIG. 4 is a diagram of the facsimile machine FX1. Each of the other facsimile machines FX2 through FXn is configured in the same manner as the facsimile machine FX1.

Referring to FIG. 4, a system controller 21 controls the entire facsimile machine FX1, and is formed by a conventional central processing unit, for example. A system memory 22 stores control processing programs executed by the system controller 21, and various parameter data required when the system controller 21 executes the control processing programs. A parameter memory 23 stores a variety of data inherent in the facsimile machine FX1. Such data includes registered data on suppressed dials, and registered data on passwords used when confidential transmission is requested.

A scanner 24 is used for reading a document with a predetermined resolution. A plotter 25 records reproduced images on a sheet of paper with a predetermined resolution. A operation/display device 26 is used for inputting various information in the facsimile machine FX1. As will be described in detail later, the operation/display device 26 includes a plurality of operation keys and a display device. A coder/decoder 27 encodes image data to compress the same, and decodes compressed data to reproduce original image data.

A communication controller 28 executes a predetermined facsimile transmission procedure (a group-3 facsimile transmission procedure based on the CCITT recommendation). A modulator/demodulator (MODEM) 29 modulates transmission data in digital form to generate a corresponding analog signal in conformity with the public telephone network PN (analog transmission network), and demodulates an analog signal received through the public telephone network PN to generate corresponding digital data. A network controller 30 is used for coupling the facsimile machine FX1 with the public telephone network PN. The network controller 30 is equipped with a conventional automatic call-out/call-in function. A system bus 31 mutually couples the system controller 21, the system memory 22, the parameter memory 23, the scanner 24, the plotter 25, the operation/display device 26, the coder/decoder 27 and the communication controller 28.

Figure 5:
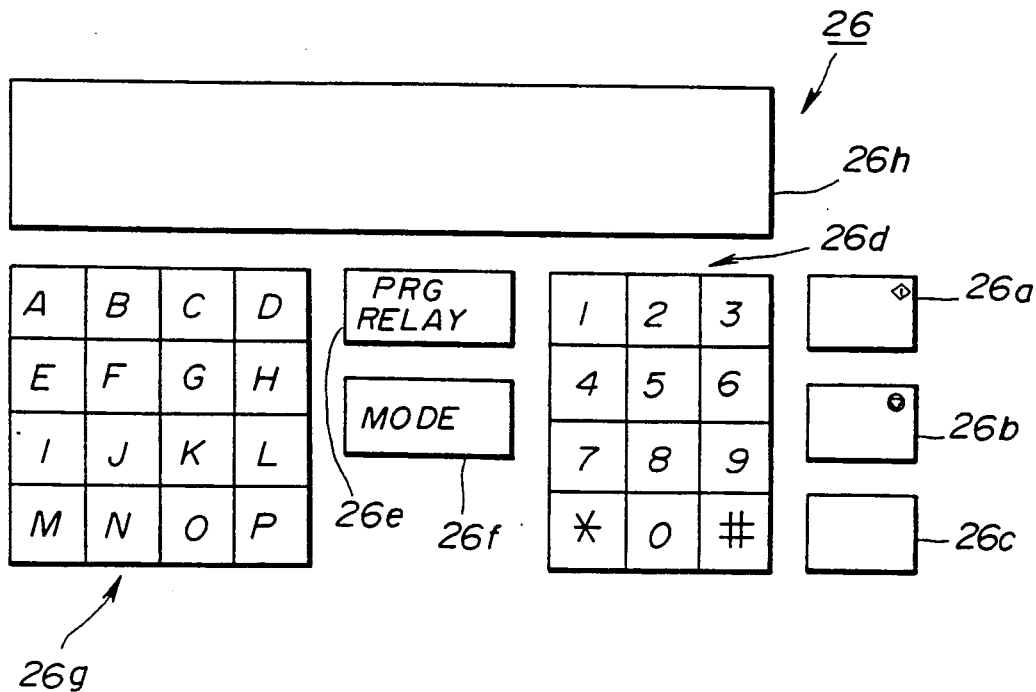
FIG. 5 is a diagram illustrating an outer appearance of an operation/display device provided in the facsimile machine shown in FIG. 4.

FIG. 5 is a diagram illustrating an outer appearance of the operation/display device 26. A start key 26a is used for starting receiving/transmitting operation of the facsimile machine FX1. A stop key 26b is used for stopping receiving/transmitting operation of the facsimile machine FX1. A copy key 26c is used for outputting a printed document such as a management report. A ten key 26d is used for inputting various numerical information such as telephone numbers and suppressed dials. A program relay key 26e is used when the facsimile machine FX1 requests a program relay transmission using a program which has been registered in the center facsimile machine FC. When the center facsimile machine FC executes the program relay transmission using a registered program, the center facsimile machine FC is in a program relay mode. In the program relay mode, the center facsimile machine FC sends image data received from the facsimile machine FX1 to requested one or more facsimile machines. Alternatively, in the program relay mode, the center facsimile machine FC sends image data received by the facsimile machine FX1 to one or more center facsimile machines. A program key group 26g includes keys labeled A through P, which correspond to respective programs registered in the center facsimile machine FC. A mode key 6f is used when one of transmission modes other than the program relay mode and other functions. An LCD 26h is used for displaying an operation guidance stored in the system memory 22.

Figure 6:
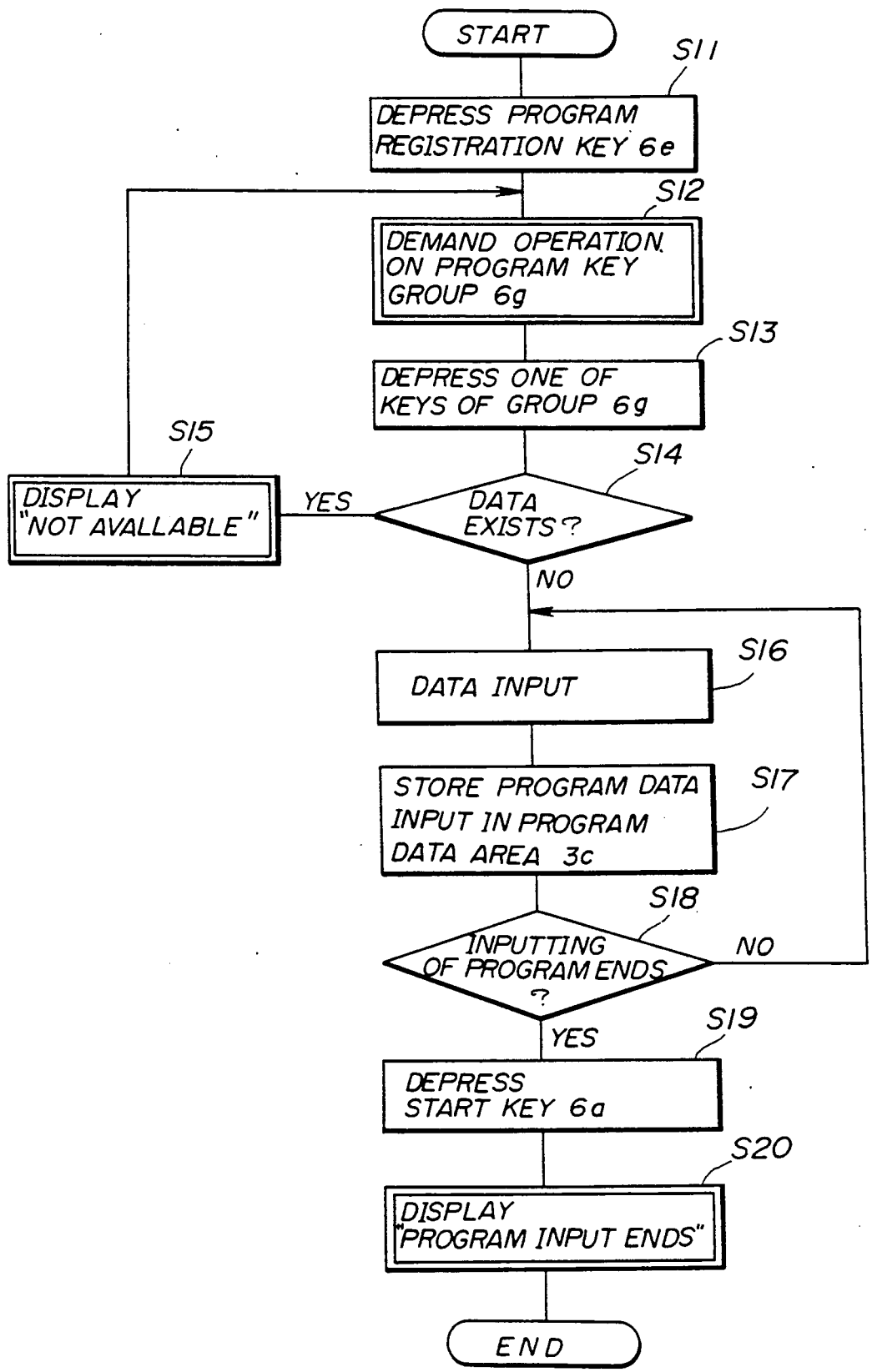
FIG. 6 is a flowchart of a procedure for registering a program relating to a program relay transmission.

A description is given of a procedure for registering a program for the program relay transmission in the center facsimile machine FC by the operator with reference to FIG. 6. The operator of the center facsimile machine FC depresses the program registration key 6e (step S11). The system controller 1 is informed of this operation of the program registration key 6e, and then has the display 6k display a guidance which demands operation of the program key group 6g (step S12). The operator depresses one of the keys A through P of the program key group 6g (step S13). Then the system controller 1 determines whether data has been registered in an area of the parameter memory 3 corresponding to the depressed key of the program key group 6g (step S14).

FIG. 7 is a diagram illustrating management of programs registered in the parameter memory 3. In the parameter memory 3, there are formed a program key table 3A, a program registration management table 3B, and a program data area 3C. The program key table 3A has areas provided for the respective keys A through P of the program key group 6g. A program number is registered in each of the areas of the program key table 3A. For example, a program number P4 has been registered in the area related to the key C. The program registration management table 3B has areas provided for the respective programs which has been registered in the parameter memory 3. Each of the areas in the program registration management table 3B serves as a data area pointer, which indicates the start address of a program stored in the program data area 3C. The corresponding program (composed of key codes) is stored in the program data area 3C from the starting address indicated by the data area pointer of the program registration management table 3B.

Turning to FIG. 6, the procedure in step S14 is executed by determining whether a program number has been registered in the area of the program key table 3A relating to the depressed key of the program key group 6g. When the area relating to the depressed key already has a program number, the procedure proceeds to step S15, in which the system controller 1 sends the display 6k a signal which displays a message indicating that the depressed key is not available (or program has been registered). Then the procedure returns to step S12. On the other hand, when the result in step S14 is NO, the procedure proceeds to step S16, in which the operator inputs data through the operation/display device 6 as will be described in detail later. Program data input in step S16 is stored in the allocated area of the parameter memory (S17). Inputting of program data is repeatedly carried out (steps S16–S18). When all program data is completely input, the operator depresses the start key 6a (step S19). When the system controller 1 is informed of operation of the start key 6a, it controls the display 6k so as to display a message indicative of the end of program data input (step S20).

Figure 8A:
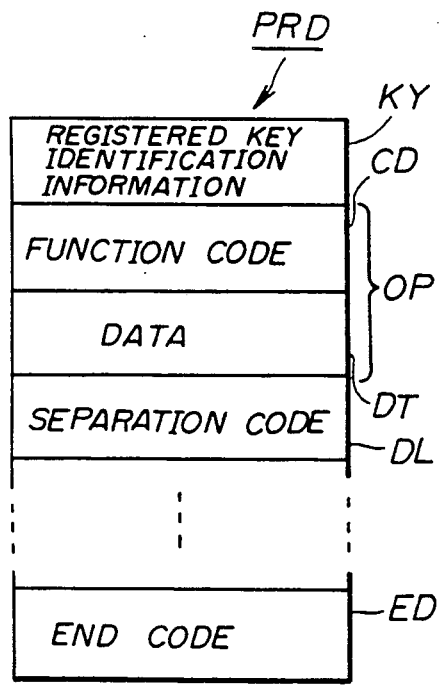
FIGS. 8A through 8D are diagrams illustrating registered program data relating to the program relay transmission.
Figure 8B:
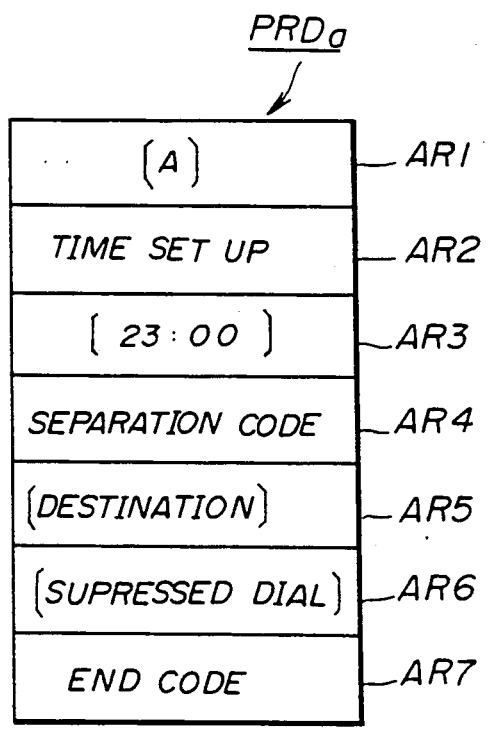

FIG. 8A illustrates a format of a program registered in the program data area 3C shown in FIG. 7. The format of registered program data labeled PRD includes a registered key identification code KY arranged at the beginning thereof. The registered key identification code KY indicates the keys A through P of the program key group 6g. When the key A is depressed in step S13 and and accepted, for example, a registered key identification code [A] is stored in an area AR1 which is the top of a program PRDa as shown in FIG. 8B. A function code CD is arranged to follow the registered key identification code KY. The function code CD represents the content of operation in step S16 (FIG. 16). The function code CD is followed by related data DT. A separation code DL separates adjacent function codes from each other.

Figure 9:
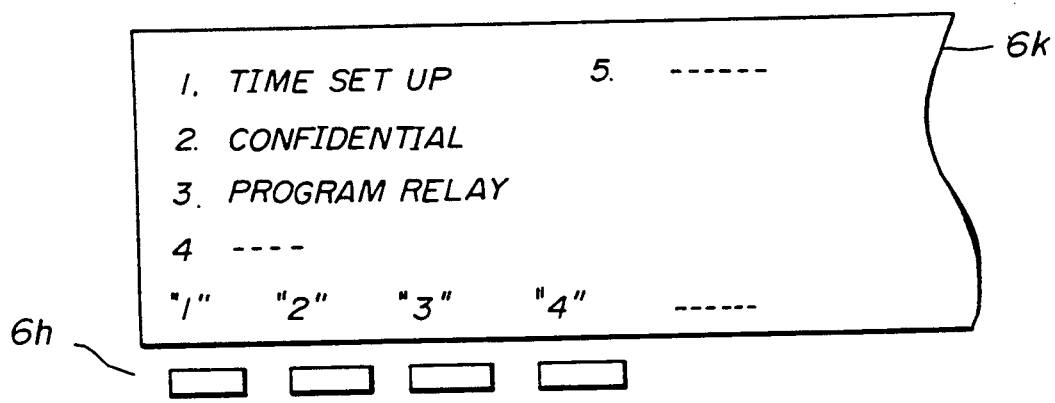
FIG. 9 is a diagram illustrating an example of displayed messages which are presented to an operator of the center facsimile machine when a program for the program relay transmission is registered.

FIG. 9 illustrates messages displayed on the display 6k. A plurality of operations such as "time setting", "confidential transmission" and "program relay" are displayed on the display 6k. When "time setting" is selected, corresponding one of the function keys 6h is depressed. The system controller 1 is informed of this operation, and generates a corresponding function code CD indicative of "time setting" on the basis of a program stored in the system memory 2. As shown in FIG. 8B, the generated function code CD is registered in an area AR2. Thereafter, time data (23:00 in the illustrated case) is input through the ten key 6d. The input time data is stored in an area AR3 and, on the other hand, is displayed. The operator determines whether the input time data is correct. When the input time data has correctly been input, the operator depresses the key 6i for inputting "YES" (FIG. 3A). In response to this key operation, the system controller 1 generates the separation code DT, which is stored in an area AR4. Then displayed information is renewed. Then the operator selects an operation "destination". A function code corresponding to the "destination" operation is generated by the system controller 1 and stored in an area AR5. In the same manner as described above, a destination (suppressed dial "10" in the case of FIG. 8B) is input and registered in an area AR6. When all data is completely input, the start key group 6g is depressed (step 19). Then the system memory 1 generates a corresponding end code ED (FIG. 8A). In the case of FIG. 8B, the end code ED is registered in an area AR6.

Figure 8C:
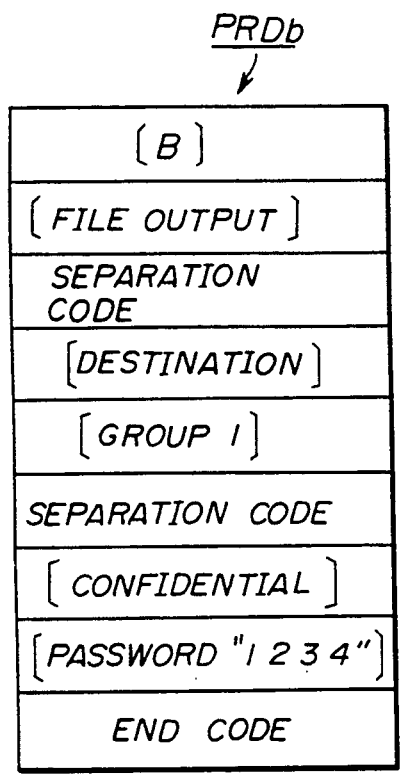

FIG. 8C is a program PRDb registered in connection with the key B of the program key group 6g. The program shown in FIG. 8C (named "file output") relates to a procedure in which received image information is reproduced through its own plotter 5 and, on the other hand, is sent to destination facsimile machines of a group 1 by confidential transmission. A password '1234' is registered in this case. A group destination function makes it possible to designate a plurality of designations by one key operation. As will be described later, the center facsimile machine FC is further provided with a suppressed dialing function or the like.

Figure 8D:
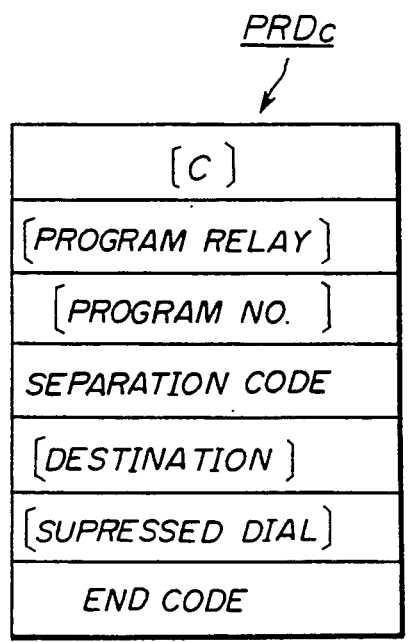
Figure 10:
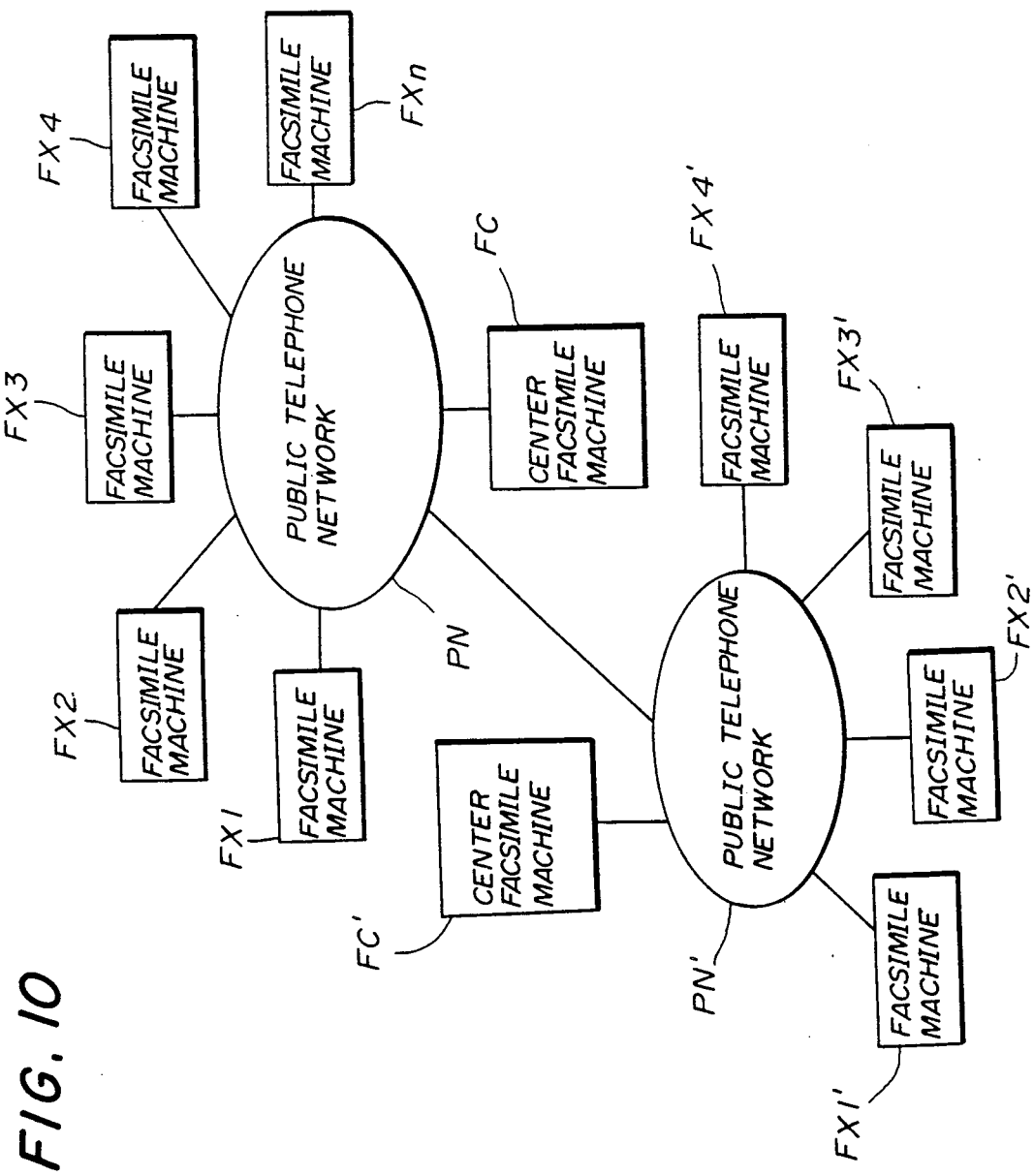
FIG. 10 is a diagram of another network structure which employs two center facsimile machines according to the present invention.

FIG. 8D is a program PRDc registered in connection with the key C of the program key group 6g. The program PRDc relates to a program relay transmission procedure in which the present center facsimile machine FC sends received image data to another relay device. A function code indicating such a program relay is registered in the program PRDc. A suppressed dial "01" indicates a relay device (another center facsimile machine, for example) to which the present center facsimile machine FC is requested to send received image data. In a case where the facsimile transmission network shown in FIG. 1 is coupled to another facsimile transmission network as shown in FIG. 10, the destination registered in the program PRDc is a center facsimile machine FC' coupled to a public telephone network PN', to which facsimile machines FX1' through FX4' are coupled.

Figure 11:
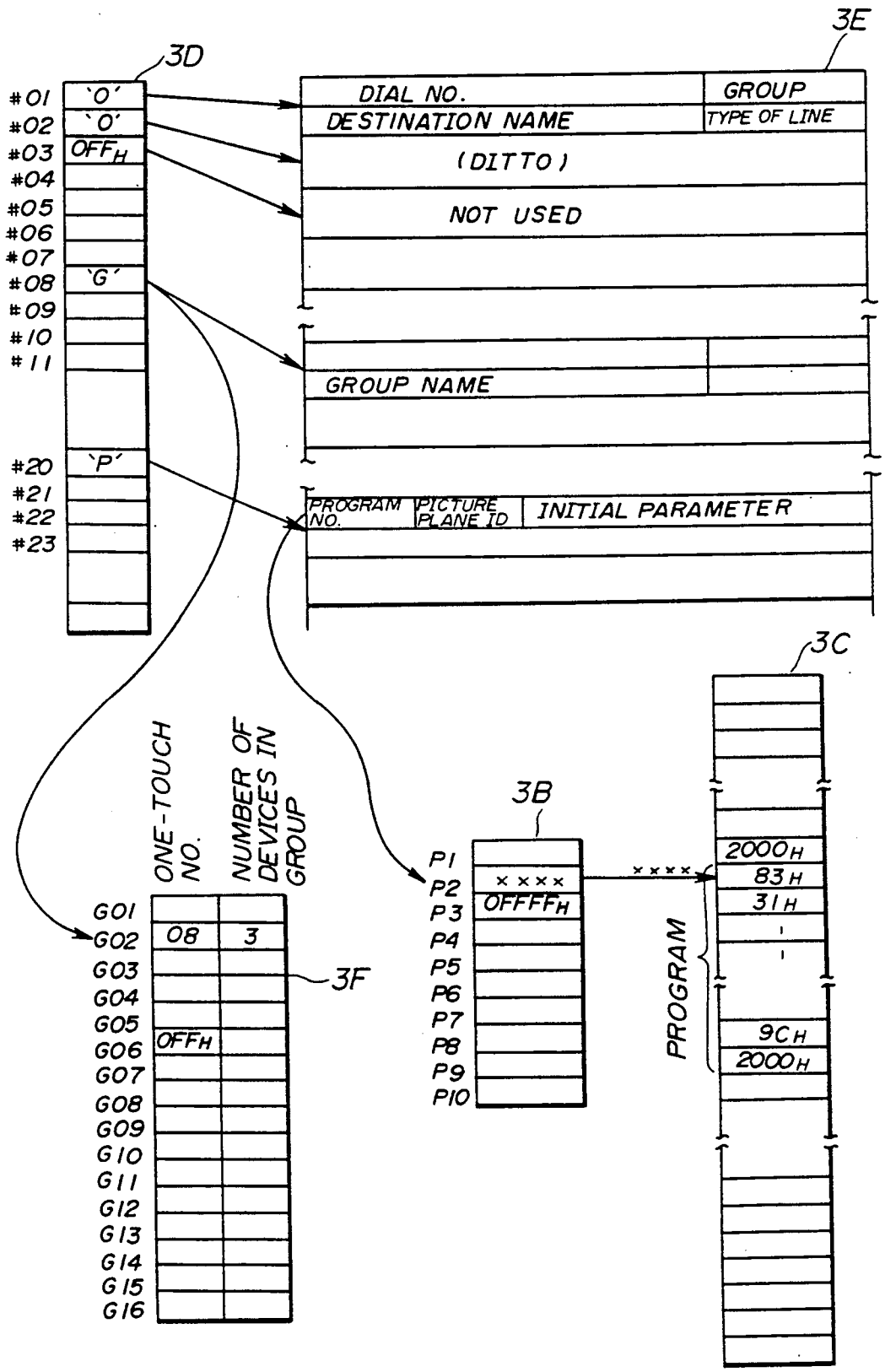
FIG. 11 is a diagram illustrating how to manage one-touch dials.

FIG. 11 illustrates a one-touch key registration management table 3D and a one-touch registration area, both of which are formed in the parameter memory 3. The one-touch registration management table 3D has an area provided for each of one-touch dial number such as #01. In the illustrated example, areas for one-touch dial numbers #01 and #02 store data relating to designations. An area for one-touch dial number #03 is not used. An area for one-touch dial number #08 stores data relating to the aforementioned group destination function in which a plural number of designations can be designated by once dial operation. Each group is managed in a group registration management table 3F in connection with the area relating to one-touch dial number #08. An area allocated to one-touch dial number #20 relates to programs used in the aforementioned program relay transmission (mode). The aforementioned program key table 3A shown in FIG. 7 is formed in the one-touch registration area 3E.

A description is given of a procedure which is executed when the facsimile machine FX1 transmits image data to the center facsimile machine FC. The operator of the facsimile machine FX1 sets a document in the scanner 24 (FIG. 4), and depresses the program relay key 26e (FIG. 5). The system controller 21 sets the program relay mode as a transmission mode, and controls the display 26h so as to display a guidance which guides selection of one of the keys of the program key group 26g. The operator knows the registered program relay transmission procedures beforehand. When the operator depresses a desired one of the keys of the program key group 26g, the system controller 2 stores data relating to the depressed key in the parameter memory 23, and waits for operation of the start key 26a. The operator inputs the telephone number of a destination (center facsimile machine FC in this example). At this time, other information used in conventional transmission may be input as necessary. After that, the operator depresses the start key 26g again. In response to this operation of the start key 26g, the system controller 21 transfers the input destination information to the communication controller 9 through the system bus 31 so that a transmission procedure is started.

Figure 12:
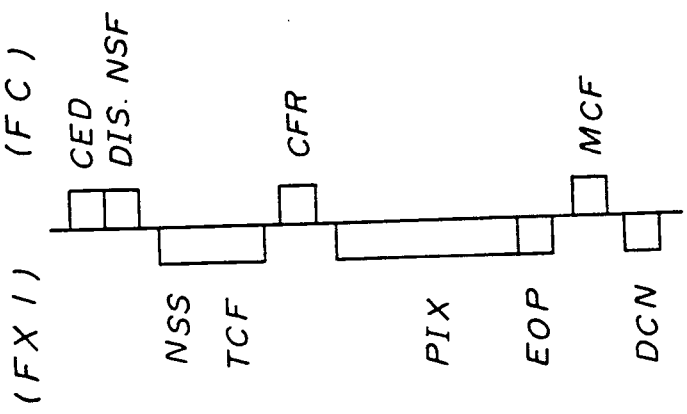
FIG. 12 is a diagram illustrating a transmission procedure for exchanging signals between a source facsimile machine and a destination facsimile machine.

Then, as shown in FIG. 12, the facsimile machine FX1 calls out the center facsimile machine FC. The center facsimile machine FC sends back the facsimile machine FX1 a called station identification (CED) signal, which indicates that the center facsimile machine FC is ready to receive data. Signal transmission between the facsimile machine FX1 and the center facsimile machine FC is based on the high-level data link frame format defined in the CCITT recommendation. Subsequently, the center facsimile machine FC sends the facsimile machine FX1 a digital identification (DIS) signal and a non-standard facilities (NSF) signal. The DIS signal informs standard functions provided in the center facsimile machine FC, and the NSF signal informs non-standard functions provided therein.

When receiving the DIS and NSF signals, the facsimile machine FX1 sets up functions used in the present transmission, such as a transmission rate, on the basis of the contents of the DIS and NSF signals. Then the facsimile machine FX1 generates a non-standard facilities set-up (NSS) signal, which includes information on the set-up contents, the use of the program relay mode, and the depressed key of the registration key group 6g. Then the facsimile machine FX sends the generated NSS signal to the center facsimile machine FC. Thereafter, the facsimile machine FX1 sends the center facsimile machine FC a training check (TCF) signal used for testing the center facsimile machine FC at the set-up transmission rate.

The center facsimile machine FC receives the NSS signal, and sets up transmission functions based on the contents of the received NSS signal. Further, the center facsimile machine FC sets the designated transmission rate in the modulator/demodulator 9. Thereafter, the center facsimile machine FC receives the TCF signal. Then the system processor 1 determines whether the rate of the occurrence of receiving error is equal to or higher than a predetermined rate. When the error rate is less than the predetermined rate, the center facsimile machine FC sends the facsimile machine FX1 a confirmation (CFR) signal, which indicates that the center facsimile machine FC is ready to receive data. When receiving the CFR signal, the facsimile machine FX1 controls the scanner 24 to read the document. Image data derived from the scanner 24 is supplied to the coder/decoder 27, which codes the image data to generate compressed data. The compressed image data PIX is sent to the center facsimile machine FC through the communication controller 28. When all image data PIX is completely sent to the center facsimile machine FC, the facsimile machine FC sends an end-of-procedure (EOP) signal.

On the other hand, the system controller 1 of the center facsimile machine FC knows, from the received NSS signal, that the present communication relates to the program relay mode. Therefore, the system controller 1 stores the received image data PIX in the image storage device 8. This procedure will be described in detail later. The coder/decoder 7 decodes the received image data PIX to thereby reproduce the original image data and then carries out error detection. When receiving the EOP signal, the center facsimile machine FC sends back the facsimile machine FC a message confirmation (MCF) signal if the detected error rate is less than a predetermined value. When the facsimile machine FX1 receives the message confirmation signal MCF from the center facsimile machine FC, the facsimile machine sends FX1 sends a disconnect (DCN) signal and releases the line so that image data transmission to the center facsimile machine FC is completed. When the center facsimile machine receives the DCN signal, it releases the line and ends image data receiving operation.

Figure 13:
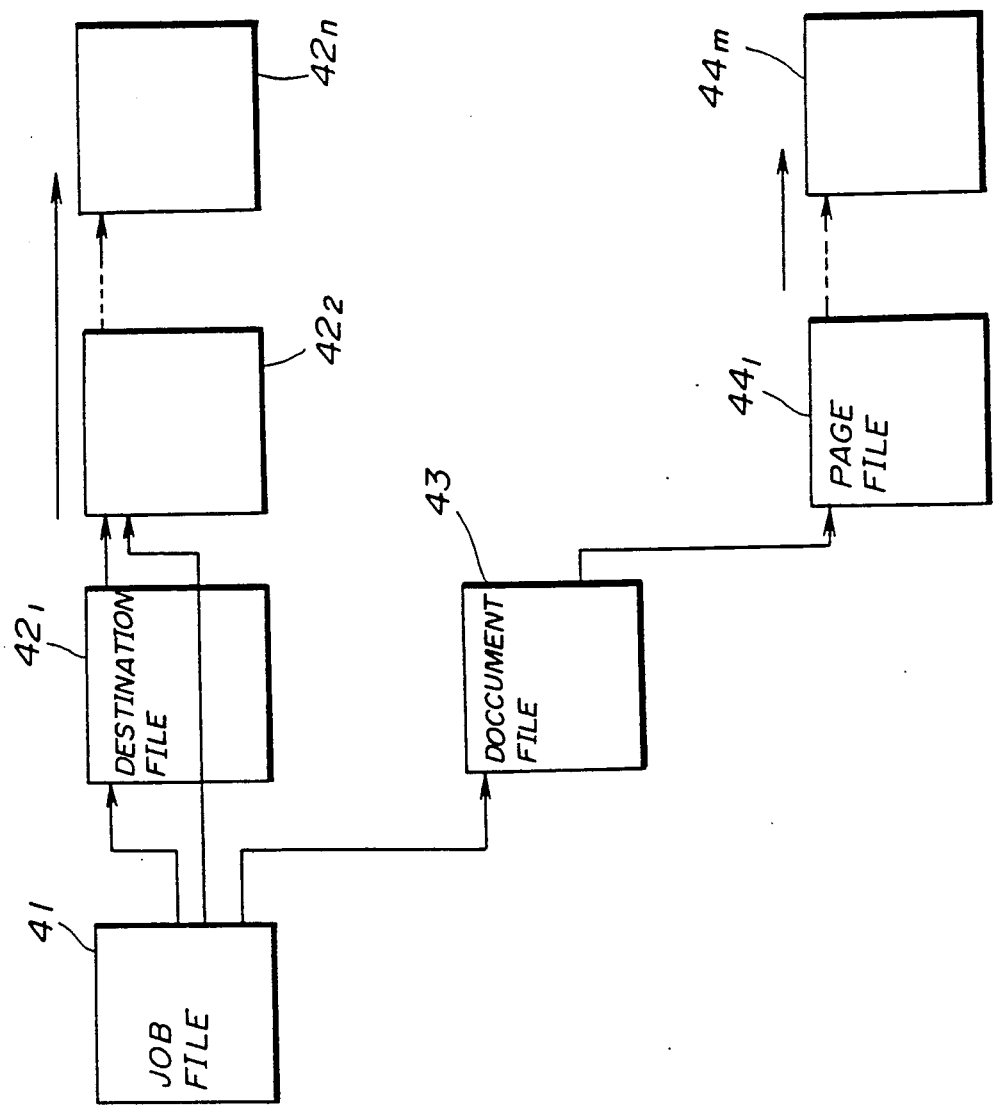
FIG. 13 is a diagram illustrating files created in the center facsimile machine.

As shown in FIG. 13, the center facsimile machine FC creates a job file 41 for every job. A destination file is coupled to the job file 41. In the illustrated example, destination files $42_1$ and $42_2$ are coupled to the job file 41, and a destination file $42_n$ (n is an integer) is coupled to a preceding destination file. A document file 43, which is coupled to the job file 41, is created for each document. A page file $44_1$, which is coupled to the document file 43, is created for every one page. When there are a plurality of pages, page files are connected in series. In the illustrated example, the last page file is provided with a reference $44_m$ (m is an integer). The above-mentioned files are formed in the parameter memory 3 (FIG. 2) by referring to the aforementioned registered program data as shown in FIGS. 8B through 8D.

Figure 14A:
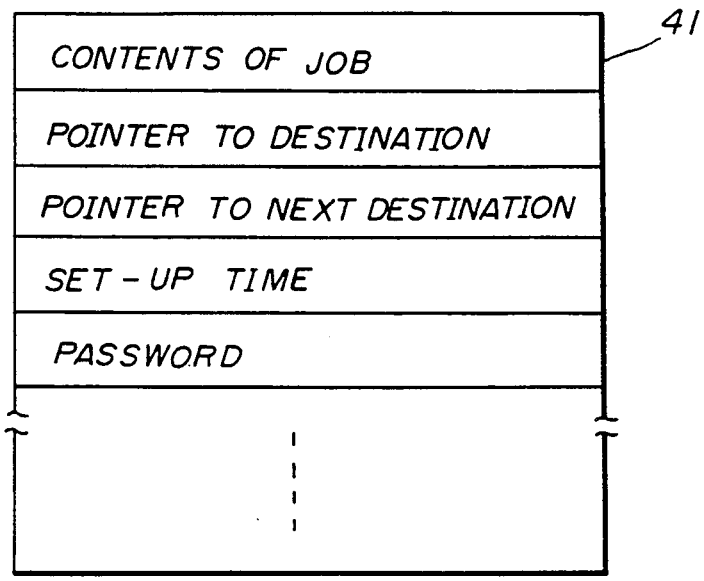
FIG. 14A is a diagram illustrating the contents of a job file.

The contents of the job file 41 is shown in FIG. 14A. The job file 41 has the contents of job, a pointer to a destination file (destination file $42_1$ in this example), a pointer to the next destination file (which is used when the destination file $42_1$ is busy), a set-up time (when the present job is executed), a password and other necessary information. The contents of job include information on transmission, program relay transmission request, reception, copy and so on. The aforementioned procedure with respect to FIG. 12 relates to the program relay transmission request. In this case, the job file 41 is a job file for the program relay transmission request.

Figure 14B:
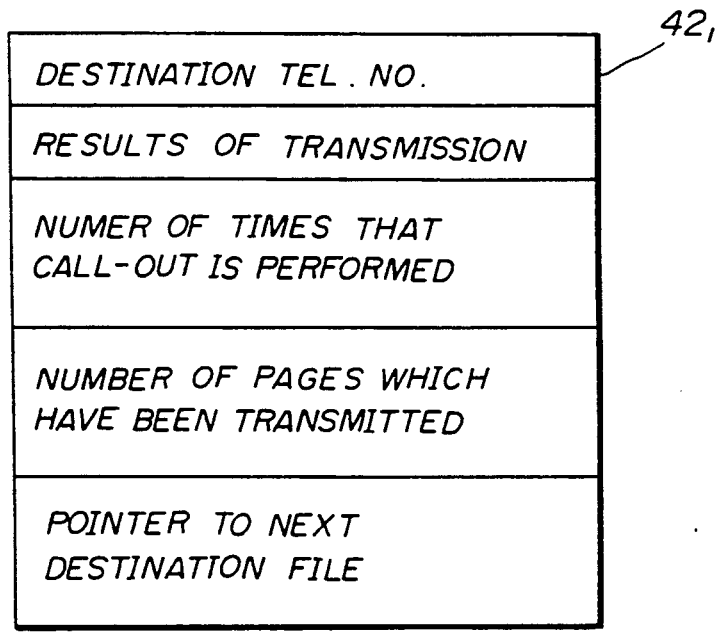
FIG. 14B is a diagram illustrating the contents of a destination file.

FIG. 14B illustrates the contents of the destination file $42_1$. The destination file $42_1$ includes a destination telephone number (including a one-touch number, a suppressed number and so on), the results of transmission (for example, information on whether image data transmission to the present destination has been ended), the number of times that a call-out is repeatedly carried out, the number of pages that have been transmitted, and a pointer to the next destination file (destination file $42_2$ in the illustrated case). Destination files are derived from the registered program data relating to a requested program relay transmission, for example.

Figure 14C:
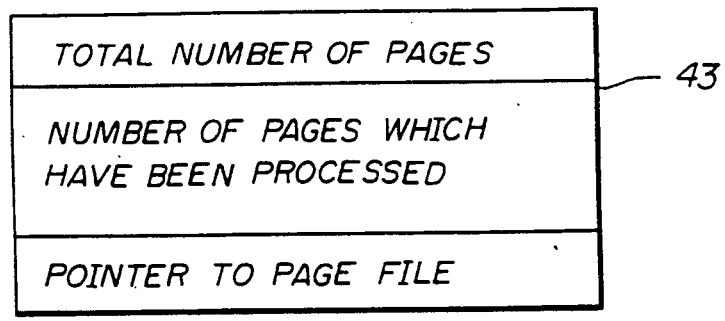
FIG. 14C is a diagram illustrating the contents of a document file.

FIG. 14C illustrates the contents of the document file 43. As shown, the document files 43 includes the total number of pages, the number of pages which have been processed, and a pointer to a coupled page file (page file $44_1$ in the illustrated case). The aforementioned image data PIX sent from the facsimile machine FX1 is managed by the document file 43.

Figure 14D:
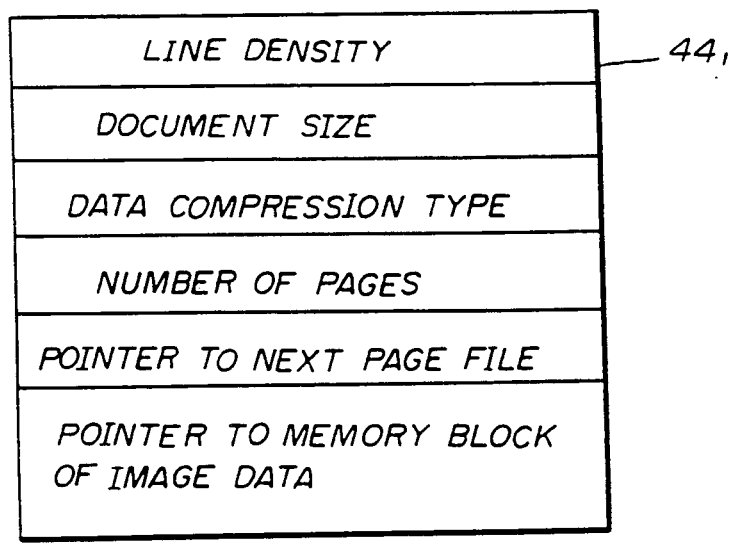
FIG. 14D is a diagram illustrating the contents of a page file.

FIG. 14D illustrates the contents of the page file $44_1$. The page file includes a line density, a document size, a data compression type, the number of pages, a pointer to the next page file, and a pointer to a related memory block of image data.

Figure 15:
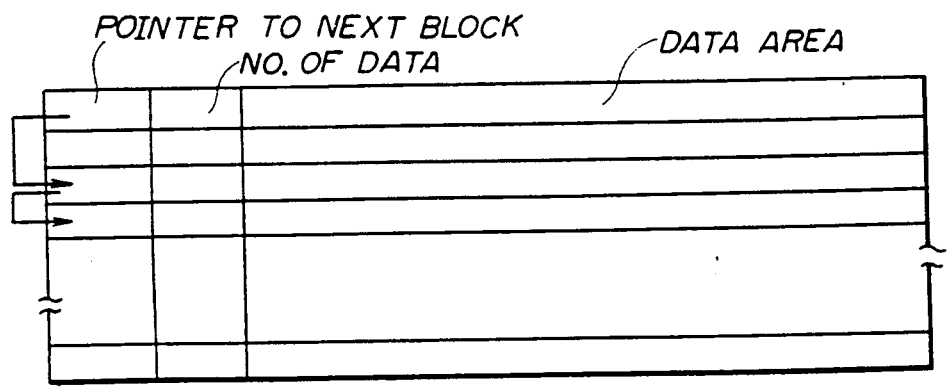
FIG. 15 is a diagram illustrating a storage area formed in an image storage device provided in the center facsimile machine shown in FIG. 2.

FIG. 15 shows a storage area of the image storage device 8 (FIG. 2), which is managed by page files $44_1$–$44_m$. The storage area is divided into a plurality of memory blocks. Each memory block consists of a pointer to the next memory block, a number of data, and a data area.

The center facsimile machine FC creates the job file 41 when the program relay transmission is requested by the facsimile machine FX1. It is now assumed that the program relay transmission relating to the registered program data PRDa shown in FIG. 8B is requested. The system controller 1 forms the job file 41, the destination files $42_1$–$42_n$, the document files 43, and the page files $44_1$ and $44_m$ by referring to the registered program data PRDa as well as other information received from the facsimile machine FX1. The system controller 1 periodically access the job file 41 and determines whether the job file 41 should now be activated by referring to the set-up time. If the result is affirmative, the system controller 41 activates the job file 41 and carries out the program relay transmission by referring to destination files $42_1$–$42_n$, the document file 43 and the page files $44_1$14 $44_m$.

The center facsimile machine FC may have a group-4 facsimile transmission mode. In this case, the center facsimile machine FC may be coupled to a digital network. Further, as shown in FIG. 16, the center facsimile machine FC may be coupled to an analog network PN and a digital network DDX through different transmission lines. Moreover, the center facsimile machine FC may be coupled directly to another center facsimile machine FCI coupled to a network.

The present invention is not limited to the aforementioned embodiments, and variations and modifications may be made without departing from the scope of the present invention.

What is claimed is:

1. A facsimile machine comprising:
   scanning means for scanning a document to generate image data;
   recording means for recording an image on a recording medium;
   communicating means, coupled to said scanning means and said recording means, for exchanging image data with a transmission line coupled to said facsimile machine;
   first storage means for storing said image data supplied from said scanning means and supplied, through said communicating means, from a source facsimile machine coupled to said transmission line through a network;
   second storage means for storing a plurality of programs each defining a procedure for relaying said image data supplied from said communicating means to at least one destination facsimile machine;

inputting means, coupled to said second storage means, for inputting said plurality of programs into said second storage means;

decision means, coupled to said communicating means, for determining which one of said plurality of programs is designated by said source facsimile machine by referring to a select signal supplied from said source facsimile machine through said communicating means; and relay transmission executing means, coupled to said communicating means, said first and second storage means and said decision means, for relaying said image data supplied from said source facsimile machine and then stored in said second storage means to said destination facsimile machine in accordance with one of said plurality of programs which is selected by said source facsimile.

2. A facsimile machine as claimed in claim 1, wherein said input means comprises first keys provided for said plurality of programs, and second keys for inputting data relating to said programs, so that each of said programs can be identified by corresponding one of said first keys.

3. A facsimile machine as claimed in claim 2, wherein said select signal supplied from said source facsimile machine includes data corresponding to one of said first keys so that said decision means selects one of said plurality of programs on the basis of said data included in said select signal.

4. A facsimile machine as claimed in claim 1, wherein said plurality of programs includes a program which defines a time when said image data supplied from source facsimile machine and then stored in said first storage means is sent to said destination facsimile machine, and an address of said at least one destination facsimile machine.

5. A facsimile machine as claimed in claim 4, wherein said destination facsimile machine is a relay device.

6. A facsimile machine as claimed in claim 1, wherein said plurality of programs include a program which defines an address of said at least one destination facsimile machine, and a password relating to said destination facsimile machine.

7. A facsimile machine as claimed in claim 1, wherein said relay transmission executing means includes means for creating a job file having information on said selected one of said programs and an address indicating the location of said corresponding image data stored in said first storage means.

8. A facsimile machine as claimed in claim 1, further comprising guidance generating means for generating a guidance used for guiding inputting of data relating to said programs, and display means for displaying said guidance so that said data is input by said input means by referring to said guidance displayed by said display means.

9. A facsimile machine as claimed in claim 8, wherein said guidance includes titles of said plurality of programs, and said input means includes keys provided for said titles so that when one of said keys is operated, corresponding one of program titles is selected and data relating to said selected program is input by said input means whereby said data relating to said selected program is stored together with said title in said second storage means.

10. A facsimile machine as claimed in claim 1, wherein said transmission line is an analog line.

11. A facsimile machine as claimed in claim 1, further comprising a second transmission line which is coupled to said communicating means and a network different from said network to which said transmission line is coupled.

12. A facsimile machine as claimed in claim 1, wherein said second transmission line is a digital transmission line.

13. A facsimile transmission system comprising:

a network;

a plurality of facsimile machines coupled to said network; and a center facsimile machine coupled to said network, said center facsimile machine including:

scanning means for scanning a document to generate image data;

recording means for recording an image on a recording medium;

communicating means, coupled to said scanning means and said recording means, for exchanging image data with said network;

first storage means for storing said image data supplied from said scanning means and supplied, through said communicating means, from a source facsimile machine which is one of said facsimile machines;

second storage means for storing a plurality of programs each defining a procedure for relaying said image data supplied from said source facsimile machine to at least one destination facsimile machine which is one of said facsimile machines;

inputting means, coupled to said second storage means, for inputting said plurality of programs into said second storage means;

decision means, coupled to said communicating means, for determining which one of said plurality of programs is designated by said source facsimile machine by referring to a select signal supplied from said source facsimile machine through said communicating means; and relay transmission executing means, coupled to said communicating means, said first and second storage means and said decision means, for relaying said image data supplied from said source facsimile machine and stored in said second storage means to said destination facsimile machine in accordance with one of said plurality of programs which is selected by said source facsimile machine.

14. A facsimile transmission system as claimed in claim 13, wherein said input means comprises first keys provided for said plurality of programs, and second keys for inputting data relating to said programs, so that each of said programs can be identified by corresponding one of said first keys.

15. A facsimile machine as claimed in claim 14, wherein said select signal supplied from said source facsimile machine includes data corresponding to one of said first keys so that said decision means selects one of said plurality of programs on the basis of said data included in said select signal.

16. A facsimile transmission system as claimed in claim 13, wherein said plurality of programs includes a program which defines a time when said image data supplied from said source facsimile machine and stored in said first storage means is sent to said destination facsimile machine, and an address of said at least one destination facsimile machine.

17. A facsimile transmission system as claimed in claim 15, wherein said destination facsimile machine is a relay device.

18. A facsimile transmission system as claimed in claim 13, wherein said plurality of programs include a program which defines an address of said at least one destination facsimile machine, and a password relating to said destination facsimile machine.

19. A facsimile transmission system as claimed in claim 13, wherein said relay transmission executing means includes means for creating a job file having information on said selected one of said programs and an address indicating the location of said corresponding image data stored in said first storage means.

20. A facsimile transmission system as claimed in claim 19, further comprising guidance generating means for generating a guidance used for guiding inputting of data relating to said programs, and display means for displaying said guidance so that said data is input by said input means by referring to said guidance displayed by said display means.

21. A facsimile transmission system as claimed in claim 20, wherein said guidance includes titles of said plurality of programs, and said input means includes keys provided for said titles so that when one of said keys is operated, corresponding one of program titles is selected and data relating to said selected program is input by said input means whereby said data relating to said selected program is stored together with said title in said second storage means.

22. A facsimile transmission system as claimed in claim 13, wherein said network is an analog network.

23. A facsimile transmission system as claimed in claim 13, further comprising a second network which is coupled to said communicating means of said center facsimile machine.

24. A facsimile transmission system as claimed in claim 1, wherein said second network is a digital network.

25. A facsimile transmission system as claimed in claim 13, wherein each of said facsimile machines comprises keys provided for said plurality of programs stored in said second storage means of said center facsimile machine, and wherein when one of said keys is operated, said select signal is supplied to said center facsimile machine through said network.

26. A facsimile transmission system as claimed in claim 13, further comprising a second center facsimile machine having the same structure as said center facsimile machine, wherein said second center facsimile machine is coupled directly to said communicating means of said center facsimile machine.

* * * * *